Figure 1:
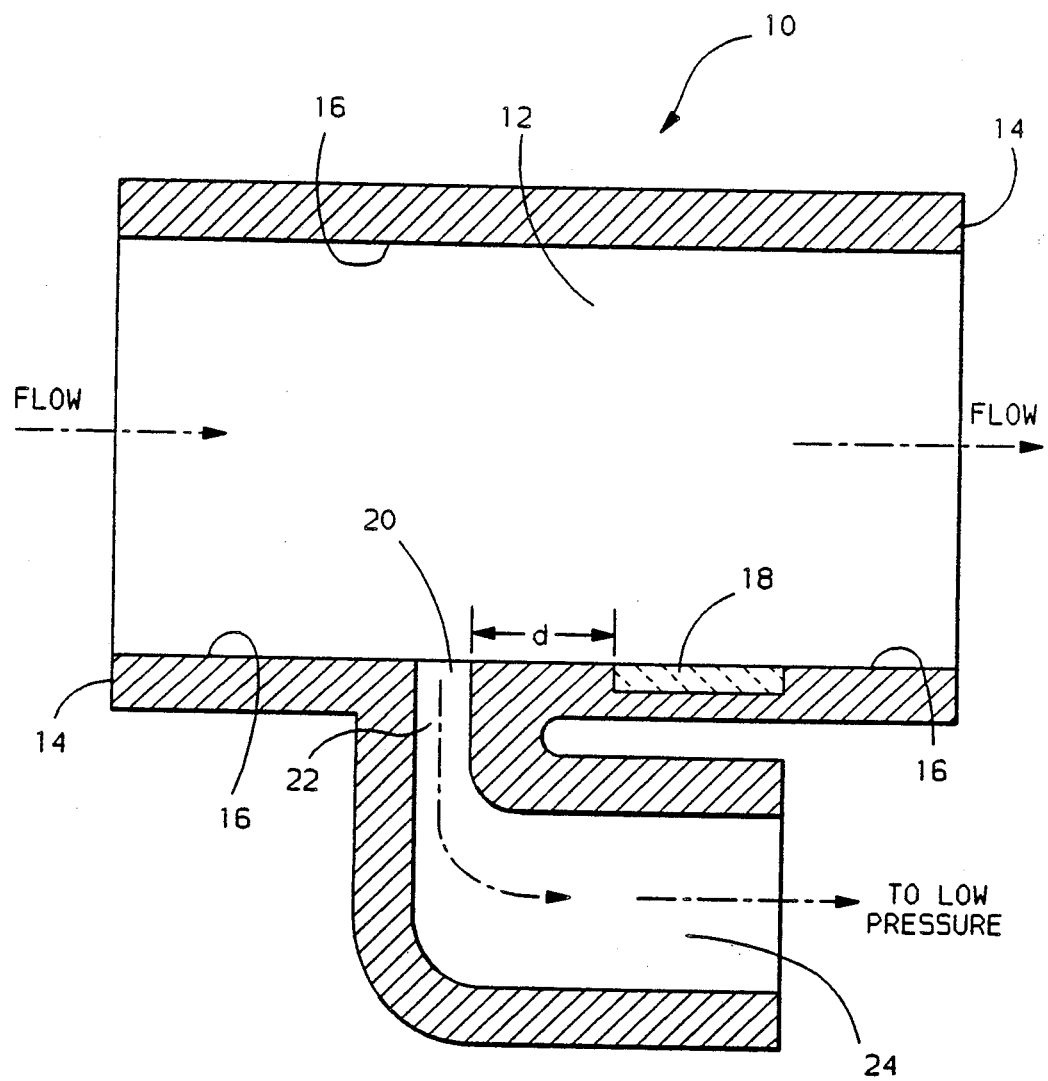

United States Patent [19]

Lambert

[11] Patent Number: 4,993,261

[45] Date of Patent: Feb. 19, 1991

[54] FLOWMETER WITH BOUNDARY LAYER CONTROL

[75] Inventor: David K. Lambert, Sterling Heights, Mich.

[73] Assignee: General Motors Corporation, Detroit, Mich.

[21] Appl. No.: 396,405

[22] Filed: Aug. 21, 1989

[51] Int. Cl.⁵ .............................................. G01F 1/68
[52] U.S. Cl. ................................ 73/204.21; 73/118.2; 73/198
[58] Field of Search ..................... 73/118.2, 202, 202.5, 73/204.11, 204.18, 204.21, 204.22, 204.26, 198

[56] References Cited

U.S. PATENT DOCUMENTS 4,785,662 11/1988 Ohta ................................... 73/204.21

Primary Examiner—Herbert Goldstein
Attorney, Agent, or Firm—Tim G. Jaeger

[57] ABSTRACT

A fluid flowmeter includes a sensor mounted on or in the inner surface of a conduit for measuring fluid flow through the conduit where the sensitivity of the sensor is dependent upon the thickness of the fluid boundary layer extending over the sensor. According to the invention, fluid is drawn out of the conduit through an aperture located a predetermined distance upstream of the sensor to remove the boundary layer developed upstream of the sensor thereby rendering the sensor immune to fluctuations in the thickness of the removed boundary layer. At the same time, a fresh boundary layer of reduced thickness and greater stability is initiated over the sensor so as to improve the sensitivity and repeatability of the sensor.

2 Claims, 1 Drawing Sheet

FLOWMETER WITH BOUNDARY LAYER CONTROL

This invention relates to a fluid flowmeter of the kind in which a sensor (e.g., of the heat transfer type) is mounted on or in the inner surface of a fluid flow conduit for measuring the fluid flow through the conduit In the above kind of fluid flowmeter, the sensitivity of the sensor may be dependent upon the thickness of the boundary layer of the fluid extending over the sensor (e.g., where the heat transfer between the sensor and the fluid is inversely related to the thickness of the boundary layer). This can lead to problems. As an example, the thickness of the boundary layer may fluctuate thereby causing uncompensable errors in the flow measurement. Alternately, the boundary layer may be so thick as to compromise the accuracy of the flow measurement, especially at low flow rates.

The present invention alleviates the foregoing problems by sucking (i.e., drawing) fluid out of the conduit through an aperture located a predetermined distance upstream of the sensor to control the fluid boundary layer extending downstream over the sensor.

In one aspect, the fluid suction of the invention is effective to remove the fluid boundary layer developed upstream of the sensor. This renders the sensor immune to fluctuations in the thickness of the removed boundary layer, thereby improving the reproducibility of the fluid flowmeter.

In another aspect, the fluid suction of the invention is effective to initiate a fresh fluid boundary layer of reduced thickness and greater stability extending downstream over the sensor. This increases the sensitivity and repeatability of the sensor, thereby improving the accuracy of the fluid flowmeter (particularly at low flow rates).

Heretofore, it has been known to suction a fluid boundary layer to control the direction or magnitude of fluid flow (as in fluidic control devices) or to control the pressure distribution over a surface (as in air foils). See, e.g., *Boundary Layer Theory*, H. Schlichting, 6th Edition, McGraw-Hill, 1968. However, the application of suction in a fluid flowmeter in accordance with the invention has not been previously known.

FIG. 1 is a schematic diagram illustrating the principles of the invention.

Referring to FIG. 1, a fluid flowmeter 10 includes a hollow cylindrical conduit 12 formed by a wall 14 having an inner surface 16. Fluid flows through the conduit 12 from left to right as indicated by the arrows labelled "flow". As an example, the conduit 12 may be part of the air intake passage of an internal combustion engine—in which case the flowing fluid is air. A sensor 18 is mounted in the wall 14 flush with the inner surface 16 for measuring the fluid flow through the conduit 12.

Problems can arise in the FIG. 1 kind of fluid flowmeter where the sensitivity of the sensor 18 is dependent upon the thickness of the fluid boundary layer extending over the sensor 18. For example, the sensor 18 may be of the heat transfer type as shown in U.S. Pat. Nos. 4,576,050 and 4,713,970 (which are incorporated herein by reference). In such case, the heat transfer between the sensor 18 and the flowing fluid is inversely related to the thickness of the fluid boundary layer extending over the sensor 18. The problem is that the fluid boundary layer may fluctuate in thickness, or its thickness may be excessive. In either case, the accuracy of the fluid flowmeter is adversely affected. The present invention alleviates these problems.

According to the invention, an aperture 20 is formed through the wall 14 of the conduit 12 in an area located a distance d upstream of the upstream edge of the sensor 18. The aperture 20 is connected via a channel 22 to a plenum 24 which, in turn, is connected to a source of low pressure (not shown). As one example, the source of low pressure may be provided by the fluid flowing on the conduit 12 in an area downstream of the sensor 18. With the foregoing arrangement, fluid is sucked (i.e., drawn) out of the conduit 12 through the aperature 20 and the channel 22 into the plenum 24. As a result, the fluid boundary layer extending downstream over the sensor 18 can be controlled to improve the reproducibility and accuracy of the flowmeter 10.

More specifically, the fluid suction through the aperture 20 is effective to remove the fluid boundary layer developed upstream of the sensor 18. The thickness of this upstream boundary layer may fluctuate on account of imperfections in the upstream surface 16 of the conduit 12. The removal of this upstream boundary layer in accordance with the invention renders the sensor 18 immune to any fluctuations in the removed boundary layer. As a result, the repeatability and reproducibility of the fluid flowmeter 10 are improved.

Further, the fluid suction through the aperture 20 is effective to initiate a fresh fluid boundary layer extending downstream over the sensor 18. The thickness of this fresh boundary layer is less than, and tends to be more stable than, the thickness of the removed boundary layer. As a consequence, the sensitivity and repeatability of the sensor 18 is increased, thereby improving the accuracy of the fluid flowmeter 10 (particularly at low flow rates). The thickness and stability of the new boundary layer will be dependent upon the distance d between the downstream edge of the aperture 20 and the upstream edge of the sensor 18. The distance d can be empirically determined for best results, and in some cases, may equal zero.

It is to be understood that the foregoing is a description of a preferred embodiment of the invention, and as such, is presented to illustrate the invention—not to unduly limit it.

What is claimed is:

1. In a fluid flowmeter in which a sensor is mounted on or in the inner surface of a fluid flow conduit where the sensitivity of the sensor is dependent upon the thickness of the fluid boundary layer extending over the sensor, an improvement including means for drawing fluid out of the conduit through an aperture located in the conduit wall a predetermined distance upstream of the sensor to remove the fluid boundary layer developed upstream of the sensor so as to render the sensor immune to fluctuations in the thickness of the removed boundary layer thereby improving the repeatability and reproducibility of the fluid flowmeter.

2. In a fluid flowmeter in which a sensor is mounted on or in the inner surface of a fluid flow conduit where the sensitivity of the sensor is dependent upon the thickness of the fluid boundary layer extending over the sensor, an improvement including means for drawing fluid out of the conduit through an aperture located in the conduit wall a predetermined distance upstream of the sensor to remove the fluid boundary layer developed upstream of the sensor and initiate a fresh fluid boundary layer of reduced thickness and greater stability extending downstream over the sensor so as to increase the sensitivity and repeatability of the sensor thereby improving the accuracy of the fluid flowmeter.

* * * * *